United States Patent
Seo et al.

(10) Patent No.: US 9,866,372 B2
(45) Date of Patent: Jan. 9, 2018

(54) ENCRYPTION APPARATUS, METHOD FOR ENCRYPTION, METHOD FOR DECRYPTION AND COMPUTER-READABLE RECORDING MEDIUM

(71) Applicant: SAMSUNG ELECTRONICS CO., LTD., Suwon-si, Gyeonggi-do (KR)

(72) Inventors: Jae-woo Seo, Suwon-si (KR); Yong-ho Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 206 days.

(21) Appl. No.: 14/630,063

(22) Filed: Feb. 24, 2015

(65) Prior Publication Data

US 2015/0312029 A1 Oct. 29, 2015

(30) Foreign Application Priority Data

Apr. 23, 2014 (KR) .................. 10-2014-0048835

(51) Int. Cl.

| | |
|---|---|
| *H04K 1/00* | (2006.01) |
| *H04L 9/00* | (2006.01) |
| *H04L 9/28* | (2006.01) |
| *H04L 9/16* | (2006.01) |
| *H04L 9/08* | (2006.01) |
| *H04L 9/06* | (2006.01) |

(52) U.S. Cl.
CPC .............. *H04L 9/008* (2013.01); *H04L 9/06* (2013.01); *H04L 9/08* (2013.01); *H04L 9/0631* (2013.01); *H04L 9/0637* (2013.01); *H04L 9/0838* (2013.01); *H04L 9/16* (2013.01)

(58) Field of Classification Search
CPC ....... H04L 9/06; H04L 9/0631; H04L 9/0637; H04L 9/008; H04L 9/08; H04L 9/16; H04L 9/0838; H04L 9/00; H04L 9/28; H04K 1/00

See application file for complete search history.

(56) References Cited

U.S. PATENT DOCUMENTS

| | | | |
|---|---|---|---|
| 6,246,768 B1 * | 6/2001 | Kim ...................... | H04L 9/0625 380/255 |
| 6,763,363 B1 * | 7/2004 | Driscoll ................. | G06F 7/584 708/252 |
| 7,873,840 B2 | 1/2011 | Agrawal et al. | |

(Continued)

OTHER PUBLICATIONS

"Order-Preserving Symmetric Encryption" Boldyreva et al, Nov. 4, 2012.

(Continued)

*Primary Examiner* — Jayesh Jhaveri
(74) *Attorney, Agent, or Firm* — Staas & Halsey LLP

(57) ABSTRACT

An encryption apparatus includes a setting generator configured to generate an increasing function parameter regarding a predetermined one-way increasing function and a secret key necessary for encryption, and an encryptor configured to generate a first order-preserving encryption area regarding a plaintext using the one-way increasing function where the increasing function parameter is applied, generate a second encryption area regarding the plain text using the secret key, and generate a ciphertext by concatenating the generated first encryption area and the generated second encryption area.

20 Claims, 13 Drawing Sheets

(56) References Cited

U.S. PATENT DOCUMENTS

| | | | | |
|---|---|---|---|---|
| 2005/0147240 A1* | 7/2005 | Agrawal | ............... | G06F 21/60 380/28 |
| 2006/0291650 A1* | 12/2006 | Ananth | ................. | H04L 9/065 380/46 |
| 2009/0323927 A1* | 12/2009 | Schneider | ............ | H04L 9/0637 380/28 |
| 2010/0098255 A1* | 4/2010 | Ciet | .................... | H04L 9/0838 380/277 |
| 2011/0191587 A1* | 8/2011 | Tian | ....................... | H04L 9/32 713/168 |
| 2011/0222687 A1* | 9/2011 | Mori | ................... | H04N 7/1675 380/200 |
| 2012/0121080 A1* | 5/2012 | Kerschbaum | .......... | H04L 9/085 380/28 |
| 2012/0163586 A1 | 6/2012 | Jho et al. | | |

OTHER PUBLICATIONS

"Order-Preserving Encryption Revisited: Improved Security Analysis and Alternative Solutions" Boldyreva et al , 2011.

\* cited by examiner

FIG. 3

$F(m,r) = f_0(m,r)[0,(n_0+1) \times 2^{80}-1] + f_1(m,r)[(n_0+1) \times 2^{80};(n_1+1) \times 2^{80}-1]$
$+ f_2(m,r)[(n_2+1) \times 2^{80};(n_2+1) \times 2^{80}-1]$

FIG. 4

$$f_0(m,r) = f_0(x = m \times 2^{80} + r) = a_0 \times x + b_0 \times \cos(2\pi \times c_0 \times x/N_0)$$
$$+ d_0 \times \cos(2\pi \times e_0 \times x/N_0), \quad (N_0 = (n_0 + 1) \times 2^{80} - 1)$$

FIG. 5

$f_1(m,r) = f_1(x = m \times 2^{80} + r - N_0) = \text{Max\_n}_0 + a_1 \times x + b_1 \times \cos(2\pi \times c_1 \times x/(N_1 - N_0))$
$+ d_1 \times \cos(2\pi \times e_1 \times x/(N_1 - N_0)), (N_1 = (n_1 + 1) \times 2^{80} - 1, \text{Max\_n}_0 = f_0(n_0, 2^{80} - 1))$

FIG. 6

$f_2(m,r) = f_2(x = m \times 2^{80} + r - N_1) = \text{Max\_n}_1 + a_2 \times x + b_2 \times \cos(2\pi \times c_2 \times x/(N_2 - N_1)) + d_2 \times \cos(2\pi \times e_2 \times x/(N_2 - N_1))$, $(N_2 = (n_2 + 1) \times 2^{80} - 1, \text{Max\_n}_1 = f_1(n_1, 2^{80} - 1))$

FIG. 7

$n_2 = n$, $n_1 \leftarrow \{\text{ceiling}[n/3], ..., \text{ceiling}[2n/3]\}$, $n_0 \leftarrow \{0, ..., \text{ceiling}[n/3]\}$

FIG. 8

1. SET a0
Do{
   Max_$n_0 \leftarrow \{2^{160}/4, ..., 2^{160}/2\}$; where Max_$n_0$ means f0($n_0$, $2^{80}$-1)
   $N_0 = (n_0+1) \times 2^{80}-1$;
   $a_0$ = floor[Max_$n_0/N_0$];
}While($a_0 < 3$)

2. SET a1
Do{
   Max_$n_1 \leftarrow \{5 \times 2^{160}/8, ..., 7 \times 2^{160}/8\}$; where Max_$n_1$ means $f_1$($n_1$, $2^{80}$-1)
   $N_1 = (n_1+1) \times 2^{80}-1$;
   $a_1$ = floor[(Max_$n_1$-Max_$n_0$)/($N_1$-$N_0$)];
}While($a_1 < 3$)

3. SET a2
Max_$n_2 = 2^{160}-1$ where Max_$n_2$ means $f_2$($n_2$, $2^{80}$-1);
$N_2 = (n_2+1) \times 2^{80}-1$;
$a_2$ = floor[(Max_$n_2$-Max_$n_2$)/($N_2$-$N_1$)];

FIG. 9

3.1. SET $b_0, c_0, d_0, e_0$
$\ell\_b_0 = \ell\_d_0 = \text{ceiling}[\log_2 N_0] + \text{ceiling}[\log_2 a_0] - 9$, $\ell\_c_0 = \ell\_e_0 = 5$
Do{
$b_0 \leftarrow \{2^{\ell\_b_0-1}, ..., 2^{\ell\_b_0}-1\}$, $c_0 \leftarrow \{1, ..., 2^5-1\}$;
$d_0 \leftarrow \{2^{\ell\_d_0-1}, ..., 2^{\ell\_d_0}-1\}$, $e_0 \leftarrow \{1, ..., 2^5-1\}$;
}While$(b_0 \times c_0 + d_0 \times e_0) \times 2\pi/N_0 \geq a_0)$ 3.2. SET $b_1, c_1, d_1, e_1$
$\ell\_b_1 = \ell\_d_1 = \text{ceiling}[\log_2 (N_1 - N_0)] + \text{ceiling}[\log_2 a_1] - 9$, $\ell\_c_1 = \ell\_e_1 = 5$
Do{
$b \leftarrow \{2^{\ell\_b_1-1}, ..., 2^{\ell\_b_1}-1\}$, $c_1 \leftarrow \{1, ..., 2^5-1\}$;
$d1 \leftarrow \{2^{\ell\_d_1-1}, ..., 2^{\ell\_d_1}-1\}$, $e_1 \leftarrow \{1, ..., 2^5-1\}$;
}While$(b_1 \times c_1 + d_1 \times e_1) \times 2\pi/(N_1 - N_0) \geq a_1)$ 3. SET $b_2, c_2, d_2, e_2$
$\ell\_b_2 = \ell\_d_2 = \text{ceiling}[\log_2 (N_2 - N_1)] + \text{ceiling}[\log_2 a_2] - 9$, $\ell\_c_1 = \ell\_e_1 = 5$
Do{
$\quad b \leftarrow \{2^{\ell\_b_2-1}, ..., 2^{\ell\_b_2}-1\}$, $c_2 \leftarrow \{1, ..., 2^5-1\}$;
$\quad d \leftarrow \{2^{\ell\_d_2-1}, ..., 2^{\ell\_d_2}-1\}$, $e_2 \leftarrow \{1, ..., 2^5-1\}$;
}While$(b_2 \times c_2 + d_2 \times e_2) \times 2\pi/(N_2 - N_1) \geq a_2)$

FIG. 10

1. $r \leftarrow \{0,1\}^{80}$
2. If $m \leq n_0$
       compute $c_{opf} = f_0(m, r)$
   Else if $m \leq n$
       compute $c_{opf} = f_1(m, r)$
   Else
       compute $c_{opf} = f_2(m, r)$
3. $c \leftarrow Enc(sk, m)$
4. $c_{ope} = c_{opf} || c$

ENCRYPTION APPARATUS, METHOD FOR ENCRYPTION, METHOD FOR DECRYPTION AND COMPUTER-READABLE RECORDING MEDIUM

CROSS-REFERENCE TO RELATED APPLICATIONS

This application claims priority benefit from Korean Patent Application No. 10-2014-0048835, filed on Apr. 23, 2014, in the Korean Intellectual Property Office, the disclosure of which is incorporated herein by reference in its entirety.

BACKGROUND

1. Field

One or more embodiments relate to an encryption apparatus, a method for encryption, a method for decryption, a computer-readable recording medium, more particularly, to an encryption apparatus capable of effectively performing order-preserving encryption with low computational complexity, a method for encryption, a method for decryption and a computer-readable recording medium.

2. Description of the Related Art

Since the quantity of data processed by individuals and corporations increases, data needs to be efficiently managed. Accordingly, recently the number of cases goes up where information is stored by utilizing external database service.

Meanwhile, in cases where sensitive information such as personal information, etc. is stored in an external device, a problem such as data spill, etc. could occur, which requires data to be encrypted to be stored.

When data is encrypted to be stored as described above, security on the stored data is guaranteed. A database provides an application environment in which data are searched and utilized, in addition to data storing. Encrypted data prohibits a database server from obtaining any information, and thus such an application service is prohibited for encrypted data, from the beginning. For instance, when there is a need for searching persons in their twenties, in case where information on age is encrypted and then is stored in a server, the server could not identify which data is about persons in their twenties.

In order to address the above problem, an order-preserving encryption scheme, which allows encrypted data to be arranged without decrypting the encrypted data by using an order-preserving encryption method, has been recently suggested. The order-preserving encryption scheme is an encryption scheme which allows encrypted data to be arranged in the same order as the original data. For instance, when the three original data are A=12, B=34, and C=56 respectively, in case where ciphertexts encrypted by an order-preserving encryption scheme are A' (ciphertext of A), B' (ciphertext of B) and C' (ciphertext of C), respectively, ciphertexts are arranged in the order described as follows: A'<B'<C'.

According to the most widely known order-preserving scheme, outputs are stochastically distributed in specific sections in the order where data are inputted, by using a probability function.

However, the scheme uses a probability function, and thus there are problems of high computational complexity and long time required for decryption. Accordingly, there is a need for an efficient order-preserving encryption scheme having lower computational complexity, compared with the conventional scheme which is based on the probability input/output.

SUMMARY

Additional aspects and/or advantages will be set forth in part in the description which follows and, in part, will be apparent from the description, or may be learned by practice of the invention.

The foregoing described problems may be overcome and/or other aspects may be achieved by one or more embodiments of an encryption apparatus capable of effectively performing order-preserving encryption with low computational complexity, a method for encryption, a method for decryption and a computer-readable recording medium.

An encryption apparatus according to one or more embodiments may include a setting generator configured to generate an increasing function parameter regarding a predetermined one-way increasing function and a secret key necessary for encryption, and an encryptor configured to generate a first order-preserving encryption area regarding a plaintext using the one-way increasing function where the increasing function parameter is applied, generate a second encryption area regarding the plain text using the secret key, and generate a ciphertext by concatenating the generated first encryption area and the generated second encryption area.

The encryption apparatus may further include: an input receiver configured to receive a size of an input range and a security parameter. The setting generator may generate the increasing function parameter regarding a predetermined one-way increasing function based on the input size of an input range, and generate a secret key corresponding to the input security parameter possibly using a symmetric-key cryptosystem method.

Meanwhile, the one-way increasing function may output a second output value for a second input value, which may be greater than a first output value for the first input value.

The one-way increasing function may include a plurality of sections, and a different increasing function may be applied to each section.

The one-way increasing function may be combination of a linear function with a cosine function.

In this case, the setting generator may calculate a coefficient of each of the linear function and the cosine function as the increasing function parameter.

Meanwhile, the encryption apparatus may further include a storage configured to store the generated ciphertext.

In this case, the storage may store a plurality of ciphertexts where a first encryption area and a second encryption area may be concatenated respectively. The encryption apparatus may further include an arranger configured to arrange the plurality of ciphertexts by comparing a value of a first encryption area of each of the plurality of ciphertexts.

The encryption apparatus may further include: a decryptor configured to decrypt a second encryption area of the ciphertext using the secret key.

The foregoing described problems may be overcome and/or other aspects may be achieved by one or more embodiments of an encryption method which may include generating an increasing function parameter regarding a predetermined one-way increasing function and a secret key necessary for encryption; generating a first order-preserving encryption area regarding a plaintext using the one-way increasing function where the increasing function parameter may be applied; generating a second encryption area regarding the plaintext using the secret key; and generating a ciphertext by concatenating the generated first encryption area and the generated second encryption area.

The encryption method may further include: receiving a size of an input range and a security parameter. The generating an increasing function parameter and a secret key may include generating the increasing function parameter regarding a predetermined one-way increasing function based on the input size of an input range and generating a secret key corresponding to the input security parameter possibly using a symmetric-key cryptosystem method.

Meanwhile, the one-way increasing function may output a second output value for a second input value, which may be greater than a first output value for the first input value.

The one-way increasing function may include a plurality of sections, and a different increasing function may be applied to each section.

The one-way increasing function may be combination of a linear function with a cosine function.

In this case, the generating an increasing function parameter and a secret key may include calculating a coefficient of each of the linear function and the cosine function as the increasing function parameter.

The encryption method may further include: storing the generated ciphertext.

In this case, the storing may include storing a plurality of ciphertexts where a first encryption area and a second encryption area may be concatenated respectively. The encryption method may further include arranging the plurality of ciphertexts by comparing a value of a first encryption area of each of the plurality of ciphertexts.

The foregoing described problems may be overcome and/or other aspects may be achieved by one or more embodiments of an encryption method which may include: receiving a ciphertext where a first encryption area where a one-way increasing function may be applied with respect to a plaintext and a second encryption area where a symmetric-key cryptosystem method may be applied to the plaintext may be concatenated, and a secret key corresponding to the symmetric-key cryptosystem; and decrypting the second encryption area of the ciphertext into a plaintext using the secret key.

The foregoing described problems may be overcome and/or other aspects may be achieved by one or more embodiments of a computer readable recording medium which may include a program for executing an encryption method. Here, the encryption method may include: receiving an increasing function parameter regarding a predetermined one-way increasing function and a secret key necessary for encryption; and generating a first order-preserving encryption area regarding a plaintext using the one-way increasing function where the increasing function parameter may be applied; generating a second encryption area regarding the plaintext using the secret key; and generating a ciphertext by concatenating the generated first encryption area and the generated second encryption area.

BRIEF DESCRIPTION OF THE DRAWINGS

These and/or other aspects will become apparent and more readily appreciated from the following description of embodiments taken in conjunction with the accompanying drawings in which:

FIG. 3 is a view illustrating an example of a one-way increasing function according to one or more embodiments, FIG. 4 is a view illustrating an example of an increasing function according to one or more embodiments, such as an increasing function of a section 1 of FIG. 3, FIG. 5 is a view illustrating an example of an increasing function according to one or more embodiments, such as an increasing function of a section 2 of FIG. 3, FIG. 6 is a view illustrating an example of an increasing function according to one or more embodiments, such as an increasing function of a section 3 of FIG. 3, FIG. 7 is a view provided to explain a method of setting a section according to one or more embodiments, FIG. 8 is a view provided to explain a method of calculating a coefficient according to one or more embodiments, such as a coefficient a of FIGS. 4 to 6, FIG. 9 is view provided to explain a method of calculating coefficients according to one or more embodiments, such as coefficient b, c, d and e of FIGS. 4 to 6, FIG. 10 is a view provided to explain an operation of an encryptor according to one or more embodiments, such as the encryptor of FIG. 1.

DETAILED DESCRIPTION

Figure 1:
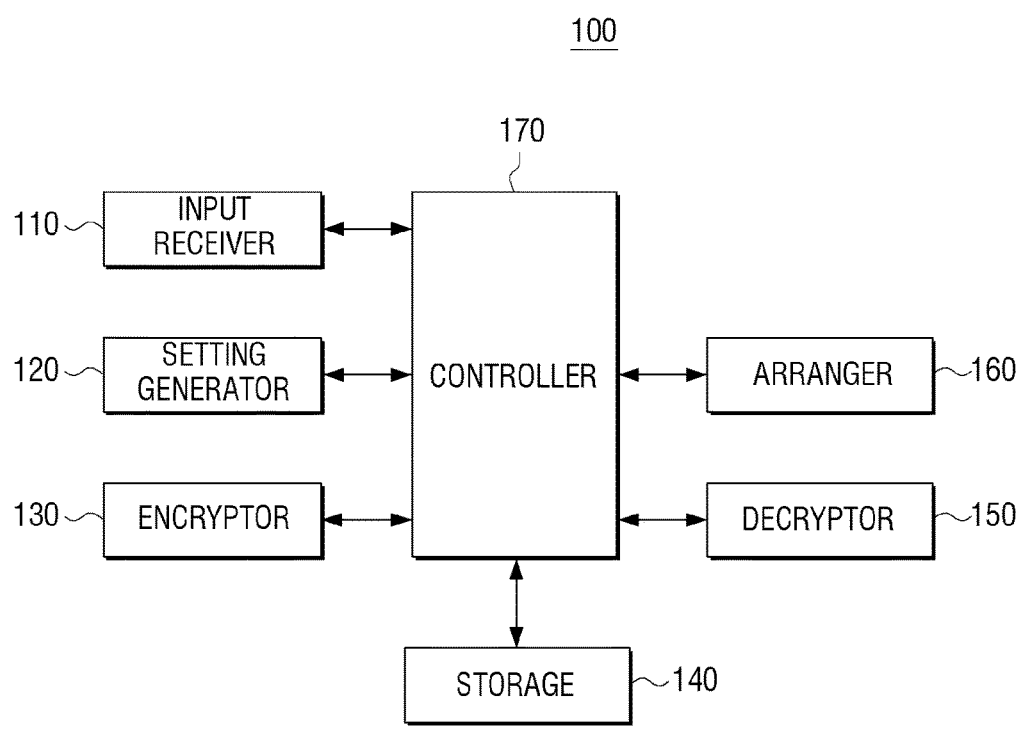
FIG. 1 is a view illustrating a structure of a data management device according to one or more embodiments.

Reference will now be made in detail to the embodiments, examples of which are illustrated in the accompanying drawings, wherein like reference numerals refer to the like elements throughout. The embodiments are described below to explain the present invention by referring to the figures.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a view illustrating a structure of a data management device according to one or more embodiments.

Referring to FIG. 1, the data management device 100 may be formed of an input receiver 110, a setting generator 120, an encryptor 130, a storage 140, a decryptor 150, an arranger 160 and a controller 170.

The input receiver 110 may be configured to be connected to an external device. The input receiver 110 may be connected to an external device not just through wired connection (e.g., USB, PS/2, etc.), the local area network (LAN) and Internet network but also through wireless communication (e.g., WiFi, bluetooth, GSM, UMTS, LTE, WiBRO, etc.).

The input receiver 110 may receive as input a size of an input size (n) and a security parameter (k). Here, the size of an input size (n) may be used for setting an increasing function parameter (param) and the security parameter (k) may be used for generating a secret key (sk).

The increasing parameters (params) may be parameters determining a predetermined one-way increasing function. Here, the one-way increasing function, which may satisfy that a second output value for an second input value, which is greater than a first input value, is greater than a first output value, may be a function which, when the relation between two random numbers x1 and x2 in a domain E meets the condition x1<x2, always satisfies the condition f(x1)<f(x2). The one-way increasing function may be a function where a different increasing function is applied to each section, in order to have high complexity.

According to one or more embodiments, a one-way increasing function may have three sections. However a one-way increasing function may have one or two sections or may have at least four sections. Meanwhile, even in the case where a one-way increasing function consists of a plurality of sections, each function which constitutes the respective sections may be a one-way increasing function, and may be combination of a linear function with a cosine function.

The input receiver 110 may receive an input of a plaintext (or data). Here, the plaintext may be data that should be encrypted and may be personal information such as a Social Security Number, annual income, age, etc. The data management device may encrypt its own plaintext. However, an external device may perform the encryption. In this case, the input 110 may receive an input of an encrypted plaintext, i.e., a ciphertext, from the external device.

The input receiver 110 may receive as input a search word for a query search. Specifically, the input receiver 110 may receive as input a search word for a database which may be stored from an external device or a user.

The setting generator 120 may generate an increasing function parameter (param) for a predetermined one-way increasing function, and a secret key necessary for encryption. Specifically, the setting generator 120 may generate an increasing function parameter (param) for a predetermined one-way increasing function based on a size of an input range which may be inputted from the input receiver 110.

Meanwhile, when different functions are applied to a plurality of sections of an increasing function in order to increase the complexity of the increasing function, the setting generator 120 may generate each paramater (param) for their respective sections. The operation of an increasing function which is formed of three sections 120 will be explained below with reference to FIGS. 3 to 9.

The setting generator 120 may generate a secret key (sk) by using symmetric key cryptosystem and a security parameter which is inputted from the input receiver 110. The operations of the setting generator 120's generating an increasing function parameter (param) and a secret key may be realized by an algorithm satisfying Equation 1 below.

$$\text{Setup}(n,k) \rightarrow (\text{param}, sk) \qquad \text{[Equation 1]}$$

Here, n is a size of an input, k is a security parameter, PARAMs are increasing function parameters with respect to a predetermined one-way increasing function, and sk is a secret key.

The encryptor 130 may convert a plaintext into a ciphertext which may allow query search. Specifically, the encryptor 130 may generate a first order-preserving encryption area regarding a plaintext by using the one-way increasing function where the increasing function parameter may be applied. Specifically, the encryptor 130 may output a value as an encrypted value by reflecting a plaintext value to the one-way increasing function where the above-described increasing function parameter (param) may be applied.

Meanwhile, the encryptor 130 may reflect a relation value of a random number, without directly reflecting a plaintext value to the increasing function.

Meanwhile, when different functions are applied to a plurality of sections of an increasing function in order to increase the complexity of the increasing function, the encryptor 130 may output an encrypted value corresponding to the plurality of sections.

The encryptor 130 may generate a second encryption area regarding the plaintext using the secret key. Meanwhile, outputting an encrypted value regarding a plaintext by using a secret key is widely known, and thus the explanation on the art is omitted here.

The encryptor 130 may generate a ciphertext by concatenating the generated first encryption area and the generated second encryption area. The ciphertext-generating operation of the encryptor 130 may be realized by an algorithm satisfying Equation 2 below.

$$\text{Execute}(\text{param}, sk, m) \rightarrow C_{ope} \qquad \text{[Equation 2]}$$

Here, m is a plaintext, $C_{ope}$, which is a ciphertext, is $C_{ope} = C_{opf} \| C$, $C_{opf}$ is a first encryption area, C is a second encryption area, $\|$ is the concatenation of strings.

The storage 140 may store the generated ciphertext. Here, the storage 140 may store a plurality of ciphertexts. The storage 140 may store a predetermined one-way increasing function.

The storage 140 may be realized as a storage medium in the data management device 100 or an external storage medium, e.g., a removable disk which may include USB memory, a storage medium which is connected to a separate host, a web server through a network, etc.

The decryptor 150 may decrypt a ciphertext. Specifically, the decryptor 150 may decrypt a ciphertext which is encrypted by the above-described encryptor 130 by using a secret key (sk). Specifically, the decryptor 150 may perform decryption with respect to the second encryption area of the ciphertext by using a secret key (sk).

The decryption operation of the decryptor 150 may be realized through an algorithm satisfying Equation 3 below.

$$\text{Recover}(sk, C_{ope}) \rightarrow m \qquad \text{[Equation 3]}$$

The arranger 160 may perform arrangement by using a predetermined plurality of ciphertexts. Specifically, the arranger 160 may arrange order, etc. of the plurality of ciphertexts by using the first encryption area. Meanwhile, according to one or more embodiments, the arranger 160 may perform arrangement operation only. However, the arranger 160 may provide various search function provided by the conventional order-preserving encryption scheme.

The controller 170 may control each configuration of the data management device 100. Specifically, when a size of an input range and a security parameter (k) are inputted through an input receiver 110, the controller 170 may control the setting generator 120 such that an increasing function parameter (param) and a secret key (sk) are generated. The controller 170 may control the encryptor 130 such that a plaintext may be encrypted by using the generated increasing function parameter (param) and secret key (sk). The generated ciphertext may, for example, be stored in the storage 140 or be transmitted in order to be stored in an external storage, etc.

Meanwhile, when a query search such as an arrangement, etc. is requested, the controller 170 may control the arranger 160 such that the arrangement can be performed through the first encryption area of the ciphertext.

When decryption of the encrypted ciphertext is requested, the controller 170 may control the decryptor 150 such that decryption is performed on the ciphertext by using a secret key.

As shown above, the data management device 100 according to one or more embodiments may generate a ciphertext having an area which is encrypted by a one-way increasing function. Accordingly, range search may be supported, possibly without performing a decryption process by using the corresponding area. A ciphertext may include an area encrypted by a secret key. Accordingly, decryption may be performed easily, and quickly by using the corresponding area in the decryption process.

Meanwhile, referring to FIG. 1, a data management device 100 may perform one or more of the operations: encryption operation, ciphertext-storing operation and decryption operation. However, a data management device may be formed of an input receiver, a setting generator and an encryptor only. A decryption apparatus may be formed of a decryptor only, and a data server may be formed of a storage and an arranger only.

Figure 2:
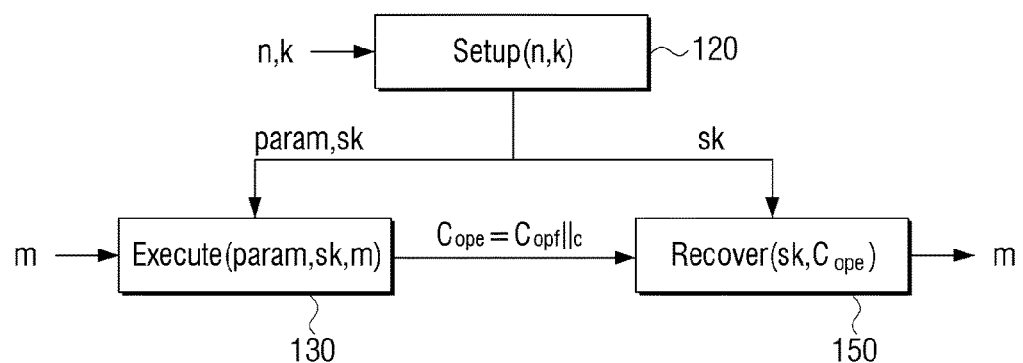
FIG. 2 is a view provided to explain an order-preserving encryption method according to one or more embodiments.

FIG. 2 is a view provided to explain an order-preserving encryption method according to one or more embodiments.

Referring to FIG. 2, the setting generator 120 may receive an input of a size of an input range (n) and a security parameter (k). The setting generator 120 may generate and may output an increasing function parameter (param) corresponding to an inputted size of an input range (n). According to one or more embodiments, a parameter related to an increasing function may be randomly selected by the setting generator 120, and a prediction possibility for the increasing function may be limited.

The encryptor 130 may perform encryption on a plaintext (m) by using the increasing function parameter (param) and the secret key (sk) generated by the setting generator 120. Accordingly, the encryptor 13 may output a ciphertext where the first encryption area which is encrypted by the one-way increasing function and the second encryption area which is encrypted by the secret key may be concatenated.

The decryptor 150 may receive an input of a ciphertext ($C_{ope}$) and a secret key (sk). The decryptor 150 may perform decryption regarding the second area (C) of the ciphertext ($C_{ope}$) by using a secret key and may output a plaintext as a result.

Hereinafter, as a way of example of a one-way increasing function, the operation of the setting generator 120 and the encryptor 130 performed in case where a one-way increasing function composed of three sections as in FIG. 3 is used will be explained with reference to FIGS. 3 to 10.

FIG. 3 is a view illustrating an example of a one-way increasing function according to one or more embodiments.

A one-way increasing function according to one or more embodiments may be designed by a linear combination of a plurality of functions. Meanwhile, a different increasing function may be applied to each of the plurality of sections in order to increase the complexity of the one-way increasing function.

The illustrated sections [a, b] mean a step function whose output is 1 in section a≤x≤b. Referring to FIG. 3, a one-way increasing function (F(m, r)) according to one or more embodiments may be represented as a combination of a plurality of functions as illustrated in FIGS. 4, 5 and 6. Specifically, FIG. 4 illustrates F(m,r) at section [0, (no+1)×280−1] according to one or more embodiments, FIG. 5 illustrates F(m,r) at section [(no+1)×280, (n1+1)×280−1] according to one or more embodiments, and FIG. 6 illustrates F(m,r) at section [(n1+1)×280, (no+1)×280−1] according to one or more embodiments.

In FIGS. 3-6, m is data, and r is a random number. For the sake of explanation, in the following description it is assumed that m has 70 bits and the random number has 80 bits, and the output of an increasing function is 160 bits. However, other allocations of bits are possible.

The setting generator 120 may set parameters which may determine the above-described increasing function [F(m,r)], a0, a1, a2, bo, b1, b2, c0, c1, c2, d0, d1, d2, e0, e1, e2. As illustrated in FIG. 7 with respect to 0≤i≤2, the setting generator 120 may divide a size of an input range, n, into three sections, $n_i$. As illustrated in FIG. 8, the setting generator 120 may set an increasing rate which may be applied to each section, $a_i$, and as illustrated in FIG. 9, the setting generator 120 may randomly generate a bandwidth $b_i$ and $d_i$ (0≤i≤2), and a cycle $c_i$ and $e_i$ of a cosine function respectively with a specific range. Ceiling in the illustrated Equation means roundup function, and floor means round-down function (for instance, ceiling[0.4]=1, and floor[0.6] =0). |a| is a bit length value of a parameter a.

FIG. 10 is a view provided to explain an operation of an encryptor according to one or more embodiments, such as the encryptor of FIG. 1.

Referring to FIG. 10, the encryptor 130 may output a ciphertext of an order-preserving encryption according to a parameter (param) and a secret key (sk) which may be generated by the setting generator 120. Specifically, the encryptor 130 may output the first encryption area ($c_{opf}$) by using a function corresponding to a section where a plaintext is applied (one of f0, f1, f2 which constitute a one-way increasing function).

The encryptor 130 may output the second encryption area (c) with respect to a plaintext by using a secret key (sk).

Lastly, the encryptor 130 may generate a ciphertext ($C_{ope}$) where the first encryption area and the second encryption area are concatenated.

The ciphertext generated by the encryptor 130 ($C_{ope}$) may consist of an output of a one-way increasing function ($C_{opf}$) and a symmetric-key cipher (c). When the order of an original data is maintained in an output ($C_{opf}$) of a one-way increasing function, the original data may be recovered in the symmetric-key cipher (c). For instance, when m1>m2 is satisfied, the relationship $c_{opf}1 > c_{opf}2$ may be maintained in $C_{opf}1 \| c1 \leftarrow$ Execute (param, sk, m1) and $C_{opf}1 \| c2 \leftarrow$ Execute (param, sk, m2).

Accordingly, the order of original data may be checked simply by comparing the order of $C_{opf}$ and m2 may be decrypted from c1 and c2 by using a secret key.

Figure 11:
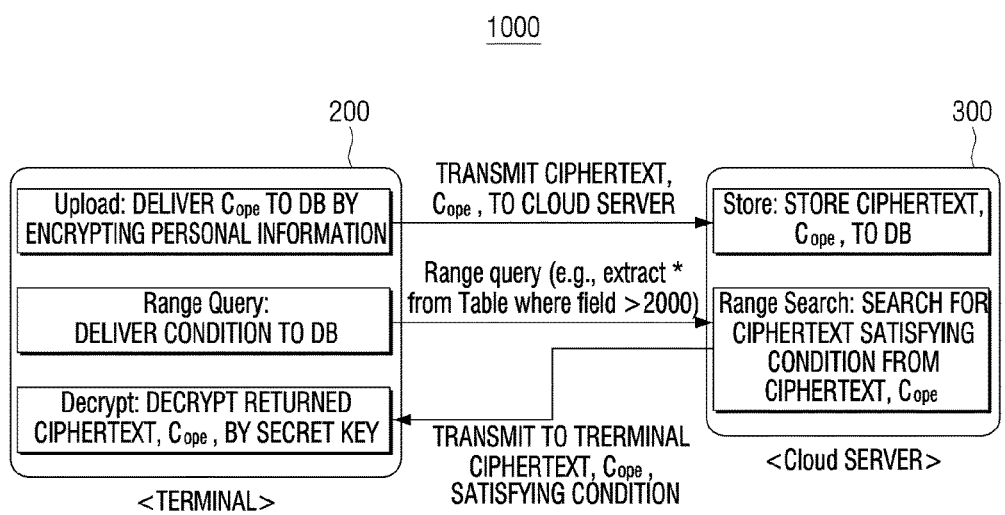
FIG. 11 is a view illustrating a structure of a data management system according to one or more embodiments.

FIG. 11 is a drawing illustrating a structure of a data management system according to one or more embodiments.

Referring to FIG. 11, the data management system according to one or more embodiments may consist of a terminal (200) and a cloud server (300).

The terminal 200 may generate a ciphertext by encrypting a plaintext such as personal information, etc. and may transmit the generated ciphertext to the cloud server 300. The generated ciphertext may be subject to query search and may have a first encryption area where an order-preserving encryption method regarding a plain text may be applied, by using a one-way increasing function where the increasing function parameter may be applied, and a second encryption area where encryption method regarding as plaintext may be applied by using a secret key.

The terminal 200 may receive an input of a search word from a user and may deliver the inputted search word.

The cloud server 300 may receive the ciphertext from the terminal 200 and may store the received ciphertext. The cloud server 300 may receive an input of a search word from the terminal 200 and may perform a search on a ciphertext based on the inputted search word. Specifically, the cloud server 300 may find a ciphertext satisfying a search condition by using the first encryption area of each ciphertext. The cloud server 300 may provide the search result to the terminal 200.

The terminal 200 which may receive the search result may perform decryption with respect to the ciphertext by using the second encryption area of the ciphertext.

Figure 12:
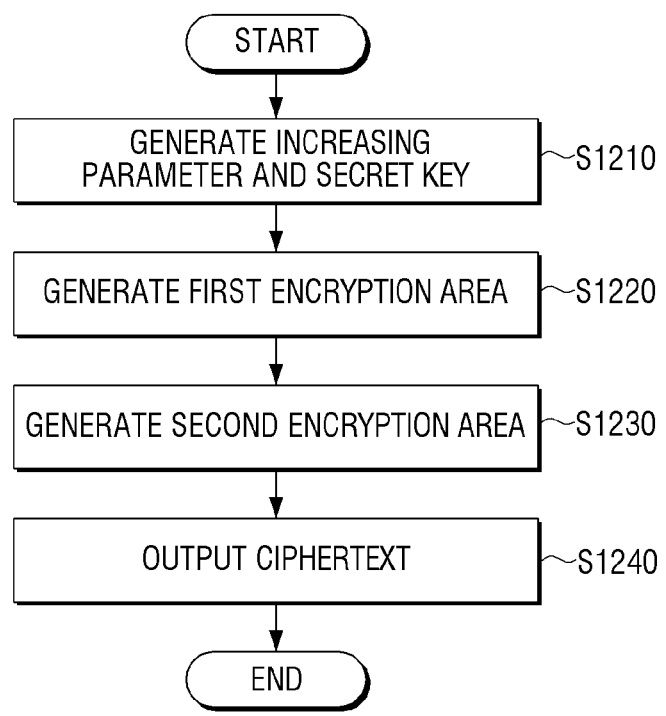
FIG. 12 is a flowchart provided to explain an encryption method according to one or more embodiments.

FIG. 12 is a flow chart provided to explain an encryption method according to one or more embodiments.

Referring to FIG. 12, an increasing function parameter (param) regarding a predetermined one-way increasing function and a secret key (sk) necessary for encryption may be generated (S 1210). Specifically, a size of an input range (n) and a security parameter (k) may be inputted and an increasing parameter of a one-way increasing function may be calculated to be generated based on the size of an input range (n), and a secret key (sk) which may correspond to a security parameter inputted by using a symmetric-key cryptosystem method may be generated. Meanwhile, according to one or more embodiments, an increasing parameter and a secret key may be generated at the time of encryption. However, the process may be omitted. That is, the process of generating an increasing parameter and a secret key may be separated from the encryption process below and may then be performed in other configuration or other steps.

A first order-preserving encryption area regarding a plain text may be generated by using a one-way increasing function where an increasing function parameter is applied (S1220).

A second encryption area regarding the plaintext may be generated by using the secret key (S1230).

A ciphertext may be generated by concatenating the generated first encryption area and the generated second encryption area.

According to the described exemplary embodiment, the encryption method may generate a ciphertext having an area which is encrypted by a one-way increasing function, which may allow query search, without requiring decryption process which uses the corresponding area. In addition, a ciphertext may include an area which may be encrypted by a secret key, which may allow easy, fast decryption process by using the corresponding area in terms of the decryption process. An encryption method according to one or more embodiments, such as the method as in FIG. 12 may be executed by a data management device having a configuration of FIG. 1 or a terminal as in FIG. 11, or may be executed by a data management device or a terminal having other configurations.

Figure 13:
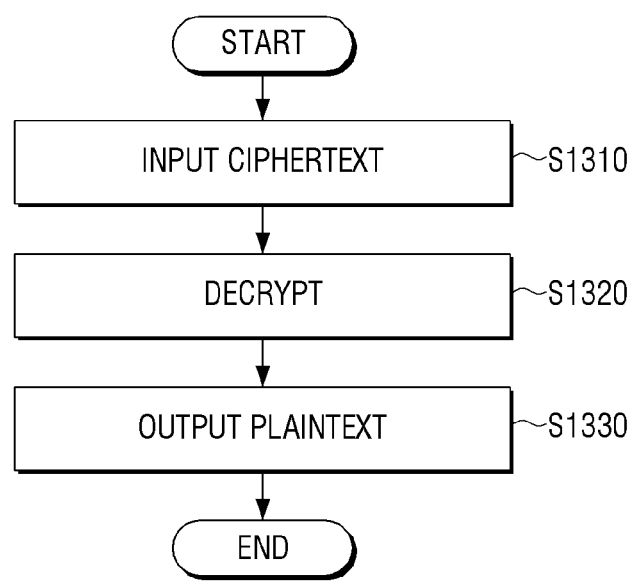
FIG. 13 is a flowchart provided to explain an decryption method according to one or more embodiments.

FIG. 13 is a flow chart provided to explain a decryption method according to one or more embodiments.

Referring to FIG. 13, first, a ciphertext may be inputted (S1310). Here, the ciphertext may be a ciphertext where a first encryption area where a one-way increasing function may be applied with respect to a plaintext and a second encryption area where a symmetric-key cryptosystem may be applied with respect to the plaintext may be concatenated. A secret key which may correspond to the symmetric key encryption may be inputted. Meanwhile, in a method according to one or more embodiments, a secret key may be presorted, and in this case, a step of a secret key being inputted may be omitted.

The ciphertext may be decrypted with respect to the second encryption area of a ciphertext by using a secret key (S1320). The art of decrypting a ciphertext using a secret key is widely known, and thus the explanation thereon is omitted.

As described above, the decryption method according to one or more embodiments may use an area which may be encrypted by a secret key of a ciphertext, and thus easy, fast decryption can be performed. The encryption method as in FIG. 13 may be executed by a data management device having a configuration described in FIG. 1 or a terminal described as in FIG. 11, or may be executed by a data management device or a terminal having other configurations.

In one or more embodiments, any apparatus, system, element, or interpretable unit descriptions herein include one or more hardware devices or hardware processing elements. For example, in one or more embodiments, any described apparatus, system, element, receiver, pre- or post-processing elements, encryptor, decryptor etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An encryption apparatus, comprising:
    a receiver to receive a size of an input range; and
    at least one processor to:
        generate an increasing function parameter regarding a predetermined one-way increasing function using the size of the input range and a secret key necessary for encryption,
        generate a first encryption data regarding a plaintext using the one-way increasing function where the increasing function parameter is applied, the first encryption data being order-preserving,
        generate a second encryption data regarding the plaintext using the secret key, and
        generate a ciphertext by concatenating the generated first encryption data and the generated second encryption data; and
    a memory to store a plurality of ciphertexts including the generated ciphertext, where a first encryption data and a second encryption data are concatenated respectively for each ciphertext of the plurality of ciphertexts,
        wherein the at least one processor is to further arrange the plurality of ciphertexts by comparing a value of the first encryption data of each ciphertext of the plurality of ciphertexts.

2. The encryption apparatus as claimed in claim 1, wherein the receiver receives a security parameter, and wherein the at least one processor is to further generate the secret key corresponding to the input security parameter using a symmetric-key cryptosystem method.

3. The encryption apparatus as claimed in claim 1, wherein the one-way increasing function outputs a first output value for a first input value and a second output value for a second input value, and wherein the second output value is greater than the first output value when the second input value is greater than the first input value and the first output value is greater than the second output value when the first input value is greater than the second input value.

4. The encryption apparatus as claimed in claim 1, wherein the one-way increasing function includes a plurality of sections and a different increasing function is applied to each section of the plurality of sections.

5. The encryption apparatus as claimed in claim 1, wherein the one-way increasing function is combination of a linear function with a cosine function.

6. The encryption apparatus as claimed in claim 5, wherein the at least one processor is to further calculate a coefficient of each of the linear function and the cosine function as the increasing function parameter.

7. The encryption apparatus as claimed in claim 1, wherein the at least one processor is to further decrypt the second encryption data of the ciphertext using the secret key.

8. An encryption method, comprising,
    generating an increasing function parameter regarding a predetermined one-way increasing function using a size of an input range, and a secret key necessary for encryption;
    generating a first encryption data regarding a plaintext using the one-way increasing function where the increasing function parameter is applied, the first encryption data being order-preserving;
    generating a second encryption data regarding the plaintext using the secret key;
    generating a ciphertext by concatenating the generated first encryption data and the generated second encryption data;
    storing a plurality of ciphertexts including the generated ciphertext, where a first encryption data and a second encryption data are concatenated respectively for each ciphertext of the plurality of ciphertexts; and
    arranging the plurality of ciphertexts by comparing a value of a first encryption data of each ciphertext of the plurality of ciphertexts.

9. The encryption method as claimed in claim 8, further comprising:
    receiving the size of the input range and a security parameter,
        wherein the generating the increasing function parameter and the secret key comprises generating the secret key corresponding to the input security parameter using a symmetric-key cryptosystem method.

10. The encryption method as claimed in claim 8,
    wherein the one-way increasing function outputs a first output value for a first input value and a second output value for a second input value, and
    wherein the second output value is greater than the first output value when the second input value is greater than the first input value and the first output value is greater than the second output value when the first input value is greater than the second input value.

11. The encryption method as claimed in claim 8, wherein the one-way increasing function includes a plurality of sections and a different increasing function is applied to each section of the plurality of sections.

12. The encryption method as claimed in claim 8, wherein the one-way increasing function is combination of a linear function with a cosine function.

13. The encryption method as claimed in claim 12, wherein the generating the increasing function parameter and the secret key comprises calculating a coefficient of each of the linear function and the cosine function as the increasing function parameter.

14. A non-transitory computer readable recording medium which includes a program for executing an encryption method, wherein the encryption method comprises:
    receiving an increasing function parameter regarding a predetermined one-way increasing function using a size of an input range, and a secret key necessary for encryption;
    generating a first encryption data regarding a plaintext using the one-way increasing function where the increasing function parameter is applied, the first encryption data being order-preserving;
    generating a second encryption data regarding the plaintext using the secret key;

generating a ciphertext by concatenating the generated first encryption data and the generated second encryption data;
storing a plurality of ciphertexts including the generated ciphertext, where a first encryption data and a second encryption data are concatenated respectively for each ciphertext of the plurality of ciphertexts; and
arranging the plurality of ciphertexts by comparing a value of a first encryption data of each of the plurality of ciphertexts.

15. An encryption method, comprising,
receiving a size of an input range;
generating an increasing function parameter regarding a predetermined one-way increasing function using the size of the input range, and a secret key necessary for encryption;
generating a first encryption data regarding a plaintext using a predetermined one-way increasing function and the received size, the first encryption data being order-preserving;
generating a second encryption data regarding the plaintext using a secret key;
generating a ciphertext by concatenating the generated first encryption data and the generated second encryption data;
storing a plurality of ciphertexts including the generated ciphertext, where a first encryption data and a second encryption data are concatenated respectively for each ciphertext of the plurality of ciphertexts; and
arranging the plurality of ciphertexts by comparing a value of a first encryption data of each ciphertext of the plurality of ciphertexts.

16. The encryption method as claimed in claim 15, further comprising:
receiving a security parameter; and
generating the secret key using a symmetric-key cryptosystem method;
wherein the first encryption data is generated using the predetermined one-way increasing function where the increasing function parameter is applied.

17. The encryption method as claimed in claim 15, wherein the one-way increasing function outputs a first output value for a first input value and a second output value for a second input value,
and wherein the second output value is greater than the first output value when the second input value is greater than the first input value and the first output value is greater than the second output value when the first input value is greater than the second input value.

18. The encryption method as claimed in claim 15, wherein the one-way increasing function includes a plurality of sections and a different increasing function is applied to each section of the plurality of sections.

19. The encryption method as claimed in claim 16, wherein the one-way increasing function is combination of a linear function with a cosine function.

20. The encryption method as claimed in claim 19, wherein the generating the increasing function parameter and the secret key comprises calculating a coefficient of each of the linear function and the cosine function as the increasing function parameter.

* * * * *